United States Patent [19]

Rousset et al.

[11] Patent Number: 4,840,925
[45] Date of Patent: Jun. 20, 1989

[54] COMPOSITIONS OF TRANSITION METAL MANGANITES IN THE FORM OF PARTICLES OR CERAMICS, THEIR PREPARATION AND THEIR USE IN THE PRODUCTION OF THERMISTORS

[75] Inventors: Abel C. Rousset, Ramonville St Agne; Guy Boissier, Toulouse; El Hadj Jabry, Benslimane; Jean-Pierre Caffin, Castres, all of France

[73] Assignee: Universite Paul Sabatier (Toulouse III), Toulouse, France

[21] Appl. No.: 870,355

[22] Filed: Jun. 4, 1986

[30] Foreign Application Priority Data

Jun. 4, 1985 [FR] France ................................ 85 08401

[51] Int. Cl.⁴ ...................... C04B 35/00; C01G 45/12
[52] U.S. Cl. ........................................ 501/1; 423/594; 423/599; 501/94
[58] Field of Search ................... 423/594, 599; 501/94, 501/1

[56] References Cited

U.S. PATENT DOCUMENTS 3,907,716 9/1975 Haacke ................................ 423/599
4,053,533 10/1977 Drehman et al. ................... 585/848

FOREIGN PATENT DOCUMENTS 53-16399 2/1978 Japan ................................... 423/599
1461764 1/1977 United Kingdom ................ 423/594

OTHER PUBLICATIONS

Philips Research Report, vol. 11, pp. 337–350 (1956), by F. K. Lotgering.

Primary Examiner—Mark L. Bell
Attorney, Agent, or Firm—Cushman, Darby & Cushman

[57] ABSTRACT

A manganite type composition of the formula $$Mn_{3-x-y-z}Ni_xCo_yM_zO_4 \qquad (I)$$

wherein M is at least one metal selected from Cu, Zn and Cd, y and z range from 0 to 1, and $(x+y+z)$ is lower than 2. This composition can also contain a doping agent. The composition is either a particulate composition wherein at least 90% of the particles have a regular form and a size lower than 5 $\mu M$ or a ceramic material having a density greater than 94% of the theoretical density. The composition is useful in the production of thermistors.

14 Claims, No Drawings

COMPOSITIONS OF TRANSITION METAL MANGANITES IN THE FORM OF PARTICLES OR CERAMICS, THEIR PREPARATION AND THEIR USE IN THE PRODUCTION OF THERMISTORS

The present invention relates to new transition metal manganite compositions, in the form of particles having an isotropic shape and a high specific area, or in the shape of ceramics. The invention also relates to their preparation and their use, principally in the production of thermistors.

It is known that transition metal manganites are basic components of ceramics which can be employed to produce passive components such as thermistors which have a negative temperature coefficient (currently designated as N.T.C.).

These passive components find markets more and more significant as temperature captors, for example in the field of space or medicine or in the fields of automobiles or of electrical housewares.

They are also used in other areas such as tension regulators, overvoltage protectors, relay temporizers, gas analyzers, and shunt temperature compensators and the like.

The development of the electronic industry and the exigencies of miniaturization require the perfecting of more and more operating products in that which concerns the reproducibility as well as long range viability of their electrical characteristics.

Actually, manganites can be prepared by the implementation of solid-solid reactions which require mixtures in the solid state of oxide powders ($MnO_2$, NiO, $Co_3O_4$), which have been subjected to repeated grinding and high temperature annealing operations.

Such techniques control neither the morphology of the resulting powders, nor the homogeneity of compositions at the submicron level.

It is well recognized that the homogeneity of compositions is an essential condition in the production of devices exhibiting reproducibility and high viability chracteristics.

In effect, grinding and "intermixing" operations rendered necessary by currently employed industrial techniques in the preparation of manganites leads with great difficulty to mixtures sufficiently homogeneous, especially when the initial oxides, as frequently occurs, have very different specific areas.

Thus, current industrial techniques for producing NTC manganites present significant disadvantages, arising from the difficulty in obtaining initial materials having reproducible chemical, structural and morphological characteristics. In particular, industrial manufacturers depend to a great extent on the suppliers of these intial materials.

Moreover, currently practiced industrial processes for preparing manganites operate using solid-solid reactions which are carried out at high temperatures and which require repeated grindings as well as intermixings and annealings. These operations are time consuming and onerous, and they do not permit the desired or satisfactory control of the homogeneity and the morphology of the resulting powders.

It is also recognized that in order to obtain quite dense ceramics which exhibit viable and reproducible electrical characteristics, it is necessary to use as starting products homogeneous powders having optimum specific area properties.

The present invention rests on the discovery of a new process which provides for the first time particulate manganite compositions having a morphology and a degree of homogeneity such that these compositions must be considered as new products.

Moreover, the process of the present invention exhibits the advantage of not employing solid-solid reactions and of being able to be operated at temperatures lower than those used in conventional processes.

The process of the invention is based on the use of oxalates as starting materials.

The preparation of nickel manganites by decomposition in the air of manganese and nickel oxalates at temperatures ranging from about 730° to 1050° C. has been described by D. G. Wickham, J. Inorg. Nucl. Chem., 1964, Vol. 26, pp. 1369–1377.

Such a process yields manganites having a spinel type structure. However, this process does not control the morphology of the resulting manganite powder. In effect, a study of the decomposition in the air of mixed manganese and nickel oxalates has been considered by the present inventors whose observation, based on thermogravimetric analysis, differential thermal analysis and radiocrystallographic analysis, explains the reasons why this decomposition reaction in the air cannot lead to the production of powders having a satisfactory morphology.

This study has shown that the decomposition of mixed oxalates leads at about 440° C. to a mixed oxide amorphous to X-rays. When heated in air beyond this temperature, this very reactive, amorphous mixed oxide is strongly oxidized up to about 700° C. and crystallizes giving two phases: one rhombohedral ($NiMnO_3$) and the other cubic ($Mn_2O_3$).

These phases disappear only at about 800° C. to give a single spinel phase of manganite.

Thus, the process of decomposition in the air of oxalates does not lead directly to pure manganites since the intermediate phase, $NiMnO_3$ is obtained which then reacts at about 800° C. with $Mn_2O_3$ in a solid-solid reaction. It is because of this requirement of effecting such a solid-solid reaction that the process of decomposition in the air of the oxalates does not provide sufficient control of the properties of the resulting powders. It has been noted in effect that the said solid-solid reaction effected at about 800° C. leads to the production of powders having high granulation and low specific area (in the order of 1 $m^2/g$) which characteristics are incompatible with the ultimate production of ceramics.

It is also necessary to mention that the manganite powders obtained by the known decomposition in the air process of oxalates have a heterogeneous granulometry, with two distributions of particle sizes.

The present invention remedies these disadvantages by effecting a decomposition of oxalates in a controlled atmosphere which produces directly the manganites, without passing through the intermediate of the $NiMnO_3$ phase.

This new process for the decomposition of oxalates in a controlled atmosphere provides the manganites at temperatures generally not exceeding 700° C.

In addition to the significant advantage of lower reaction temperatures, the fact of producing nickel manganites without passing through the compound, $NiMnO_3$ compound leads to a more homogeneous distribution of the elements, a good isotropic shape of the particles and especially the possibility of controlling the granulation and specific area thereof which is an essential advantage for the production of ceramics. In particular, only a single homogeneous distribution of particle sizes is obtained.

Concerning the preparation of cobalt manganites, the study of the decomposition of the air of mixed oxalates of cobalt and manganese oxalates has shown that the behavior of these oxalates was different from that observed with the nickel and manganese oxalates. In particular, no noticeable phenomenon of oxidation was observed and radiocrystallographic analysis did not evidence a $CoMnO_3$ phase analogous to the $NiMnO_3$ phase observed in the case of nickel.

However, in the case of cobalt, the process of the present invention of decomposition in a controlled atmosphere also provides unexpected advantages. In effect, the decomposition in a controlled atmosphere of mixed manganese and cobalt leads to powders exhibiting an improved morphology with regard to granulation, isotropic shape of particles, their size, and their specific area. These improved characteristics are manifested by improved properties in the ultimate ceramic. In this case again, there is then a significant advantage in decomposing the oxalates in a controlled atmosphere, as is the case for nickel manganites.

Analogous advantages have also been observed in the production of other transition metal manganites.

The present invention thus relates to compositions of derivatives of the manganite type or analogues having the general formula I:

$$Mn_{3-x-y-z}Ni_xCo_yM_zO_4 \qquad (I)$$

wherein

M represents at least one divalent metal selected from copper, zinc and cadmium, x, y and z are numbers ranging from 0 to 1, and the sum (x+y+z) is lower than 2, it being understood that the numbers x, y and z cannot all simultaneously be zero; that x can vary from 0.6 to 1 when y=z=0; and that y can vary from 0.6 to 1 when x=z=0; the said composition also being able to contain a doping agent in an amount not exceeding 5 atom percent relative to the total number of atoms (Mn+Ni+Co+M).

The said compositions are either in the form of a particulate composition, characterized by the fact that at least 90% of the particles have the following characteristics:

morphology—regular and essentially isotropic shape, granulation—a size lower than or equal to 5 micrometers, structure—spinel type, specific area—greater than 3 m²/g, or in the form of a coherent ceramic material characterized by the fact that it possesses a density at least equal to 94% of the theoretical density.

It is appropriate to note that in Formula I, M can represent several metals such as, for example, copper, zinc, cadmium, etc.

In other words, in this case $M_z$ represents in Formula I:

$$M^1{}_{z1}M^2{}_{z2}M^3{}_{z3} \text{ etc.}$$

wherein $M^1$, $M^2$, $M^3$ each represent a metal that can represent M; z1, z2, z3 are numbers ranging from 0 to 1 such that z1+z2+z3=z, z being defined as above.

Representative doping agents which can be present in the compositions of the present invention include, for example, aluminum, vanadium, chromium, titanium, boron, silicon, germanium, antimony, barium or even a rare earth metal such as samarium, etc.

The specific area of the powders can be measured by the BET method, that is to say by the measurement of absorption and desorption of an inert gas at low temperature.

The invention principally relates to particulate compositions of derivatives of Formula I, in particular those based on nickel (y=z=0), those based on cobalt (x=z=0), as well as compositions containing both nickel and cobalt, nickel and copper, nickel and zinc, or nickel and cadium, and compositions without nickel or even compositions containing neither nickel, nor cobalt, for example compositions such that M=Cd and Cu; or M=Cd and Zn; or M=Cu and Zn, etc.

The present invention concerns in particular compositions of derivatives of Formula I whose number of consituents (Mn, Ni, Co, M) is on the whole 2 or 3 and principally those compositions described hereafter in the experimental section of the specification.

The invention also relates to a process for preparing the compositions such as defined above.

This process principally comprises heating an oxalate or a mixed oxalate of Formula II;

$$(Mn_{1-u-v-w}Ni_uCo_vM_w)C_2O_4 \qquad (II)$$

wherein M is defined above, u, v and w are numbers such that:

3u=x, 3v=y and 3w=z, x, y and z being defined above, or a hydrate of said oxalate, in an atmosphere comprising a mixture of an inert gas and oxygen having a reduced oxygen partial pressure, at the decomposition temperature of the oxalate considered; maintaining the said temperature until the oxalate is completely decomposed; then heating the resulting product in an inert atmosphere at a temperature greater than 420° C. and lower than 800° C. for a time sufficient to obtain particles having the desired sizes and specific surfaces, then if desired, the resulting particulate compositions can be transformed into a ceramic in accordance with conventional methods.

In a preferred embodiment, the process of the present invention can exhibit the following characteristics, singly or in combination:

The initial heating is carried out under reduced oxygen partial pressure i.e., lower than 0.1 atmosphere (about $10^4$ Pa). This oxygen partial pressure can vary, for example, from 0.05 to 0.1 atmosphere (about $5 \times 10^3$ to $10^4$ Pa) and in particular from 0.065 to 0.075 atmosphere ($6.5 \times 10^3$ to $7.5 \times 10^3$ Pa);

the initial heating is effected in an atmosphere comprising a mixture of nitrogen and oxygen;

the second heating is effected at a temperature ranging preferably from about 500° to 700° C.;

the second heating is carried out in the absence of oxygen, for example in a nitrogen atmosphere; and after the second heating, the resulting product is rapidly cooled, by quenching, in an inert atmosphere, for example, nitrogen.

As indicated above, the process for the decomposition of oxalates in a controlled atmosphere leads directly to manganites. For example, in the case of compounds based on nickel, the oxides obtained after decomposition of the oxalates in a slight oxidizing atmosphere are transformed directly into nickel manganites without the transitory appearance of a $NiMnO_3$ phase.

In addition to the significant advantage with regard to temperatures, the fact of producing the manganites without passing through the $NiMnO_3$ compound leads to a more homogeneous distribution of the elements and improves the granulation and specific area of the resulting product, which is essential for the ultimate transformation into ceramics. It is appropriate to note in this regard that the specific area of the powders can be modulated and can for example be reduced, if necessary, by increasing the duration and/or the temperature of heating while, under the same conditions, the size of the particles increase.

Ceramics produced from the above compositions are also a part of the present invention. These ceramics are prepared in accordance with conventional methods. They are characterized principally by a high density, greater than 94% of their theoretical density. The production of high density ceramics is in effect a significant condition for the production of components having good electronic protperties. These ceramics possess principally relatively weak resistivities, ranging generally from a few tens to a few thousand ohm.cm.

Another advantage of the ceramics of the present invention is that they can be obtained at a sintering temperature lower than the temperature necessary to obtain a satisfactory sintering with manganites prepared according to known processess. The advantage of temperature is near about 150° C.

The invention also relates to the use of the particulate composition described above in the production of ceramics, and the use of these ceramics principally as thermistors.

The following non-limiting examples illustrate the invention.

EXAMPLES 1-3

A. The following is a detailed method of preparing a nickel manganite of Formula I wherein $y=z=0$ and $x=0.66$. (Product of Example 1; see Table I hereafter).

There is employed as the initial reactant a mixed oxalate of manganese and nickel of the formula $(Mn_{0.78}Ni_{0.22})C_2O_4.2H_2O$.

This mixed oxalate was obtained in the following manner:

Weigh out:
- 52.30 g of $NiCl_2.6H_2O$,
- 154.21 g of $MnCl_2.4H_2O$ and
- 144.95 g of ammonium oxalate.

These three salts are separately dissolved in the cold, in water in a manner to obtain concentrations of 2 moles/liter for $NiCl_2$ and $MnCl_2$ and 0.17 mole/liter for ammonium oxalate. The solutions of manganese and nickel salts are mixed and then stirred for about 10 minutes. To this mixture the solution of ammonium oxalate is added and stirring is continued for 15-20 minutes. The resulting precipitate which is green colored is then filtered. This precipitate comprises the oxalate having the formula indicated above.

The decomposition of this mixed oxalate, under a controlled atmosphere ($P_{O2}=0.065$ atm, $P_{N2}=0.935$ atm) at 700° C. leads to the manganite having the formula $Mn_{2.34}Ni_{0.66}O_4$.

Note: 1 atmosphere is equal to about $10^5$ Pa.

10 g of the said mixed oxalate are placed in a reactor in which there is established an atmosphere constituted by a gaseous nitrogen/oxygen mixture in the respective volumetric proportions of 100:6.5, corresponding to an oxygen partial pressure of 0.065 atmosphere.

The oxalate is then heated at a temperature of 420° C., which temperature is maintained for 2 hours.

The gaseous nitrogen/oxygen mixture is then replaced with an inert atmosphere (nitrogen) and the reaction product is heated up to 700° C.

The resulting product is then quenched in an inert atmosphere in a manner to avoid oxidation thereby yielding a nickel manganite in the form of a powder whose particles exhibit the following chracteristics:
- granulation: octahedrons of 4 to 5 μm,
- specific area: 6 m²/g,
- phase: a single cubic spinel phase (parameter a=8.451 Angstroms).

B. Using the particulate composition obtained above, ceramic pieces have been prepared by operating in the following manner: 10 g of the resulting powder is mixed with 15 weight percent of a binding agent (RHODOVIOL 4/20, sold by Rhone-Poulenc). The mixture is then pressed into the form of a disk, having a diameter of 0.5 cm and a thickness of close to 0.1 cm, under a pressure of 4 kbars.

The resulting pressed disk is submitted to an air sintering operation at a temperature of 1160° C., the time of sintering being 2 hours. The thus treated disk is then cooled at a rate of 30° C./hour.

The results obtained with various initially mixed oxalates are given in Table I below (Examples 1-3).

C. The properties of the resulting ceramic are then studied and compared with those of a ceramic prepared with a nickel manganite having an analogous composition but obtained by decomposition in the air of the corresponding mixed oxalate.

EXAMPLES 4 AND 5

Preparation of cobalt manganites

By operating as above, but starting with mixed oxalates of manganese and cobalt, manganite compositions were prepared which exhibit those characteristics set forth in Table II below.

The properties of the ceramics prepared with these manganites are also found in Table II.

EXAMPLES 6-12

In a similar manner, there have been prepared mixed manganites and the corresponding ceramics having the compositions and under the conditions indicated in Tables III and IV.

TABLE I

| Example | Composition $Mn_{3-x}Ni_xO_4$ x = | Density* a | Density* b | Resistivity (ohm·cm) a | Resistivity (ohm·cm) b | B(K) a | B(K) b |
|---|---|---|---|---|---|---|---|
| 1 | 0.66 | 4.7 | 4.9 | 2.265 | 2.070 | 3.908 | 3.900 |
| 2 | 0.71 | 4.7 | 4.9 | 2.330 | 1.588 | 3.876 | 3.875 |
| 3 | 0.81 | 4.7 | 4.9 | 1.592 | 1.030 | 3.827 | 3.855 |

*Sintering - 1,160° C.
B = Temperature coefficient (in °K.)
a = Decomposition in the air of the oxalate at 800° C.
b = Decomposition of the oxalate in a controlled atmosphere at 700° C.

TABLE II

| Example | Composition $Mn_{3-x}Co_xO_4$ x = | Density* a | Density* b | Resistivity* (ohm·cm) a | Resistivity* (ohm·cm) b | B(K)* a | B(K)* b |
|---|---|---|---|---|---|---|---|
| 4 | 0.81 | 4.2 | 4.8 | 2.4 × 10⁶ | 399,000 | 5.250 | 5.210 |

TABLE II-continued

| Example | Composition $Mn_{3-x}Co_xO_4$ x = | Density* a | Density* b | Resistivity* (ohm·cm) a | Resistivity* (ohm·cm) b | B(K)* a | B(K)* b |
|---|---|---|---|---|---|---|---|
| 5 | 0.96 | 4.4 | 4.8 | 158,000 | 132,500 | 5.200 | 5.250 | a = Particles obtained at 700° C. in air
b = Particles obtained at 700° C. under a controlled atmosphere
*Ex. 4 - Sintering 1130° C.
*Ex. 5 - Sintering 1250° C.

TABLE III

| Example | Composition | Sintering | Density | Resistivity (ohm·cm) | B(K) |
|---|---|---|---|---|---|
| 6 | $Ni_{0.63}Co_{0.15}Mn_{2.22}O_4$ | F-1280° C. 2 h | 4.8 | 1,010 | 3,770 |
| 7 | $Co_{0.33}Ni_{0.31}Mn_{2.36}O_4$ | F-1300° C. 4 h | 4.8 | 2,660 | 3,890 |
| 8 | $Co_{0.67}Ni_{0.13}Mn_{2.20}O_4$ | F-1300° C. 4 h | 4.8 | 15,500 | 4,260 |

F = Sintering

TABLE IV

| Example | Composition | Sintering | Density | Resistivity (ohm·cm) | B(K) |
|---|---|---|---|---|---|
| 9 | $Cd_{0.63}Ni_{0.71}Mn_{1.66}O_4$ | F-1100° C.-2 h | 5.2 | 3,500 | 4,240 |
| 10 | $Ni_{0.60}Cu_{0.06}Mn_{2.34}O_4$ | F-1160° C.-2 h | 4.8 | 666 | 3,665 |
| 11 | $Zn_{1.06}Ni_{0.60}Mn_{1.34}O_4$ | F-1100° C.-2 h | 5.1 | 2,990 | 3,880 |
| 12 | $Cu_{0.87}Mn_{2.13}O_4$ | F-1000° C.-1 h | 4.8 | 15 | 2,430 |

EXAMPLES 13 AND 14

Preparation of mixed manganites of nickel and copper doped with aluminum

The preparation of the oxalates is effected as before by the addition of ammonium oxalate to an aqueous solution containing manganese chloride, nickel chloride, copper chloride and also aluminum chloride. To obtain an amount of 0.3% of aluminum (in atoms) in the oxide, it is necessary to dissolve an amount of aluminum chloride corresponding to 5 molar percent.

The conditions of decomposition remain the same as those indicated in the preceding Examples. The type of sintering and the physico-chemical properties of the resulting ceramics are indicated in Table V.

TABLE V

| Example | Composition | Sintering | Density | Resistivity (ohm·cm) | B(K) | $\frac{\Delta R^*}{R}$ |
|---|---|---|---|---|---|---|
| 13 | $Mn_{1.88}Ni_{0.66}Cu_{0.45}Al_{0.01}O_4$ | 1180° C.-2h-cooling rate-30° C./hr | 5.1 | 2 | 2200 | <5% |
| 14 | $Mn_{1.67}Ni_{0.66}Cu_{0.66}Al_{0.01}O_4$ | 1180° C.-2h-cooling rate-30° C./hr | 5.1 | 0.5 | 1480 | <2% |

*$\frac{\Delta R}{R}$ = relative variation of the resistance of a piece of ceramic after being maintained at 125° C. for 1000 hours.

What is claimed is:

1. A composition of a derivative of the manganite type having the formula $$Mn_{3-x-y-z}Ni_xCo_yM_zO_4 \quad (I)$$

wherein
M represents at least one divalent metal selected from copper, zinc and cadmium,
x, y and z are numbers ranging from 0 to 1, with the sum (x+y+z) being lower than 2,
with the provisos that the numbers x, y and z cannot simultaneously all be equal to zero, that x can range from 0.6 to 1 when y=z=0 and that y can range from 0.6 to 1 when x=z=0;
said composition being in the form
(a) of a particulate composition wherein at least 90 percent of the particles have the following characteristics:
(i) morphology—essentially isotropic form,
(ii) granulometry—a size lower than or equal to 5 micrometers,
(iii) structure—spinel type and
(iv) specific area—greater than 3 m²/g, or
(b) of a ceramic having a density at least equal to 94 percent of its theoretical density.

2. The composition of claim 1 which also contains a doping agent in an amount not exceeding 5 percent in atoms relative to the total number of atoms, (Mn+Ni+Co+M).

3. The composition of claim 2 wherein the doping agent is aluminum, vanadium, chromium, titanium, boron, silicon, germanium, antimony, barium or a rare earth metal.

4. The composition of claim 1 based on nickel wherein y=z=0.

5. The composition of claim 1 based on cobalt wherein x=z=0.

6. The composition of claim 1 selected from
(a) a composition containing both nickel and cobalt,
(b) a composition containing both nickel and copper,
(c) a composition containing both nickel and zinc, or
(d) a composition containing both nickel and cadmium.

7. The composition of claim 1 wherein x=y=0 and M represents (a) cadmium and copper, (b) cadmium and zinc or (c) copper and zinc.

8. The composition of claim 1 wherein the number of constituents, Mn, Ni, Co and M, is 2 or 3.

9. The composition of claim 1 having a single homogeneous distribution of particle sizes.

10. A process for preparing a composition of a derivative of the manganite type having the formula $$Mn_{3-x-y-z}Ni_xCo_yM_zO_4 \qquad (I)$$

wherein

M represents at least one divalent metal selected from copper, zinc and cadmium, x, y and z are numbers ranging from 0 to 1, with the sum (x+y+z) being lower than 2, with the provisos that the numbers x, y and z cannot simultaneously all be equal to zero, that x can range from 0.6 to 1 when y=z=0 and that y can range from 0.6 to 1 when x=z=0;

said composition being in the form
(a) of a particulate composition wherein at least 90 percent of the particles have the following characteristics:
   (i) morphology—essentially isotropic form,
   (ii) granulometry—a size lower than or equal to 5 micrometers,
   (iii) structure—spinel type and
   (iv) specific area—greater than 3 m²/g, or
(b) of a ceramic having a density at least equal to 94 percent of its theoretical density, said process comprising initially heating an oxalate or mixed oxalate having the formula $$(Mn_{1-u-v-w}Ni_uCo_vM_w)C_2O_4 \qquad (II)$$

wherein

M has the meaning given above, u, v and w are numbers such that: 3u=x, 3v=y and 3w=z, and x, y and z have the meanings given above, or a hydrate thereof, in an atmosphere consisting of a mixture of an inert gas and oxygen having an oxygen partial pressure lower than 0.1 atmosphere, at the decomposition temperature of the said oxalate, maintaining said temperature until complete decomposition of the oxalate and finally heating the resulting product in an inert atmosphere at a temperature greater than 420° C. and lower than 800° C. for a time sufficient to improve the size the specific area of the resulting particles.

11. The process of claim 10 which includes transforming said particles into a coherent ceramic material.

12. The process of claim 10 wherein the final heating is carried out at a temperature ranging from about 500° to 700° C.

13. The process of claim 10 wherein subsequent to the final heating the resulting particles are rapidly cooled by tempering in an inert atmosphere.

14. A thermistor made by the process of claim 11.

* * * * *